(12) United States Patent
Casse et al.

(10) Patent No.: US 11,273,555 B2
(45) Date of Patent: Mar. 15, 2022

(54) MULTIMODAL SENSOR ARRAY FOR ROBOTIC SYSTEMS

(71) Applicant: Robotik Innovations Inc., Palo Alto, CA (US)

(72) Inventors: Bernard D. Casse, Saratoga, CA (US); Clinton J. Smith, San Francisco, CA (US); Christopher Lalau Keraly, San Francisco, CA (US); Matthew E. Shaffer, Menlo Park, CA (US); Christopher A. Paulson, Redwood City, CA (US)

(73) Assignee: RIOS Intelligent Machines, Inc., Palo Alto, CA (US)

(*) Notice: Subject to any disclaimer, the term of this patent is extended or adjusted under 35 U.S.C. 154(b) by 232 days.

(21) Appl. No.: 16/573,811

(22) Filed: Sep. 17, 2019

(65) Prior Publication Data

US 2020/0094412 A1  Mar. 26, 2020

Related U.S. Application Data

(60) Provisional application No. 62/733,642, filed on Sep. 20, 2018, provisional application No. 62/733,640, (Continued)

(51) Int. Cl.
  *B25J 9/16* (2006.01)
  *B25J 9/04* (2006.01)
  (Continued)

(52) U.S. Cl.
  CPC ............. *B25J 9/1694* (2013.01); *B25J 9/042* (2013.01); *B25J 9/1612* (2013.01); *B25J 9/1653* (2013.01);
  (Continued)

(58) Field of Classification Search
  CPC ........ B25J 9/1694; B25J 9/1612; B25J 9/042; B25J 9/1653; B25J 13/082; B25J 13/081;
  (Continued)

(56) References Cited

U.S. PATENT DOCUMENTS 9,613,180 B1* 4/2017 Hoffmann ............... G16Z 99/00
2009/0031825 A1* 2/2009 Kishida ................... G01L 5/228
73/862.621

(Continued)

*Primary Examiner* — Abby Y Lin
*Assistant Examiner* — Esvinder Singh
(74) *Attorney, Agent, or Firm* — Bever, Hoffman & Harms, LLP

(57) ABSTRACT

A multimodal sensing architecture utilizes an array of single sensor or multi-sensor groups (superpixels) to facilitate advanced object-manipulation and recognition tasks performed by mechanical end effectors in robotic systems. The single-sensors/superpixels are spatially arrayed over contact surfaces of the end effector fingers and include, e.g., pressure sensors and vibration sensors that facilitate the simultaneous detection of both static and dynamic events occurring on the end effector, and optionally include proximity sensors and/or temperature sensors. A readout circuit receives the sensor data from the superpixels and transmits the sensor data onto a shared sensor data bus. An optional multimodal control generator receives and processes the sensor data and generates multimodal control signals that cause the robot system's control circuit to adjust control operations performed by the end effector or other portions of the robot mechanism and when the sensor data indicates non-standard operating conditions.

8 Claims, 8 Drawing Sheets

Related U.S. Application Data filed on Sep. 20, 2018, provisional application No. 62/733,641, filed on Sep. 20, 2018.

(51) Int. Cl.
  *G01L 5/22* (2006.01)
  *B25J 13/08* (2006.01)
(52) U.S. Cl.
  CPC .............. *B25J 13/082* (2013.01); *G01L 5/226* (2013.01); *G05B 2219/37351* (2013.01)
(58) Field of Classification Search
  CPC ........ B25J 13/083; G01L 5/226; G01L 5/228; G01L 5/009; G05B 2219/39531; G05B 2219/39533; G05B 2219/40567; G05B 2219/37431; G05B 2219/37351; G05B 2219/37378; G05B 2219/37434; G05B 2219/37634; G05B 2219/40143; G05B 2219/37357; G05B 2219/39527; G05B 2219/39528; G05B 2219/39532
  See application file for complete search history.

(56) References Cited

U.S. PATENT DOCUMENTS

| | | | |
|---|---|---|---|
| 2010/0139418 A1* | 6/2010 | Loeb ....................... | G01L 5/228 |
| | | | 73/862.046 |
| 2015/0019013 A1* | 1/2015 | Rose ....................... | B25J 15/10 |
| | | | 700/258 |
| 2015/0239126 A1* | 8/2015 | Matsuzawa ............ | B25J 9/1694 |
| | | | 700/258 |
| 2017/0312922 A1* | 11/2017 | Unno ..................... | B25J 9/1694 |
| 2019/0030714 A1* | 1/2019 | Knopf .................. | F15B 13/0402 |
| 2019/0077023 A1* | 3/2019 | Eto ....................... | B25J 9/1612 |

* cited by examiner

MULTIMODAL SENSOR ARRAY FOR ROBOTIC SYSTEMS

RELATED APPLICATION

This application claims priority from U.S. Provisional Patent Application No. 62/733,640, entitled "Multimodal Sensing Architecture For Robotic Tactile Exploration", filed on Sep. 20, 2018, U.S. Provisional Patent Application No. 62/733,641, entitled "Topology Of Multimodal Sensing With Integrated Readout Circuitry For Robots", filed on Sep. 20, 2018, and U.S. Provisional Patent Application No. 62/733,642, entitled "High-Speed, High-Bandwidth Multimodal Tactile Sensors On Bendable Platform", filed on Sep. 20, 2018.

FIELD OF THE INVENTION

This invention relates generally to robotic systems and more particularly to sensors utilized to control robot mechanisms.

BACKGROUND OF THE INVENTION

Robotic systems typically integrate mechanical, electrical/electronic and computer science technologies in a way that produces autonomously controlled mechanisms that selectively perform a variety of different mechanical operations. For example, articulated robots are a class of industrial robotic systems in which an end effector (e.g., a hand or gripper) mounted on a robot "arm" mechanism is utilized to perform repetitive tasks, such as picking up a target object at one location and moving the target object to a second location. The robot arm mechanism and end effector are generally controlled in accordance with a programmed series of movement operations that are based, for example, on a precise X-Y-Z starting location at which a target object will be reliably available for pick-up, and a precise X-Y-Z terminal location at which a receptacle is positioned to receive the target object when dropped off. While this programmed movement control approach is acceptable for use in highly ordered environments, erroneous and possibly dangerous situations can occur when minor variations arise, such as displacement of a target object from the expected starting location or a receptacle is displaced at the terminal location, whereby performance of the programmed movement operations can result in damage to one or both of the target objects and the end effector/gripper. To avoid such incidents, modern robotic systems often employ camera systems and single-modal sensors (e.g., pressure sensors) that are mounted on the end effector and provide feedback information that allows the system's control circuit to recognize and adjust for minor variations.

The lack of a rich end effector sensory feedback is one of the main limitations of modern robotic systems. That is, conventional single-modality sensors (e.g., pressure sensing only) are unable to provide sufficient information to avoid many common industrial accidents and/or to perform complex assembly processes. For example, although single-modality pressure sensors provide sufficient data to verify that a predetermined gripping force is being applied by a hand-type end effector onto a target object, they lack the rich sensor feedback needed to recognize when the target object is slipping from the end effector's grasp. In addition, when mounting a canister-type object over a cylindrical object, single-modality pressure sensors provide insufficient data regarding excessive contact between the cannister and cylindrical objects when the canister and cylindrical objects are misaligned. Note that while camera-type feedback systems may be useful to identify and adjust for such occurrences in some cases, critical portions of the camera's field of view are often occluded by the end effector, which limits the functionality of camera-type feedback systems. In contrast to single-modality sensors, the human hand consists an unparalleled multimodal sensory system (i.e., mechanoreceptors sensing both pressure and vibration, and thermoreceptors sensing temperature), which largely contributes to its unprecedented dexterous manipulation. Specifically, the human multimodal sensing architecture provides fine-grained cues about contact forces, textures, local shape around contact points, and deformability, all of which are critical for evaluating an ongoing grasp, and to trigger force correction measures in case of instability.

What is needed is a sensing architecture for robotic systems that overcomes the deficiencies of conventional single-modality sensors. In particular, what is needed is sensing architecture that mimics human-like tactile exploration to facilitate object-manipulation and recognition tasks that present problems to robotic systems using conventional single-modality sensors.

SUMMARY OF THE INVENTION

The present invention is generally directed to a multimodal sensing architecture that utilizes spatially arrayed multi-sensor groups (superpixels) to facilitate advanced object-manipulation and recognition tasks performed by mechanical end effectors (e.g., a robot gripper/hand attached to end of a robot arm mechanism) in robotic systems. In a manner similar to sensory receptors found in human fingers, the superpixels are spatially arrayed over contact surfaces of the end effector (e.g., on the inward-facing surfaces of robot gripper fingers) such that each superpixel generates localized multimodal sensor data (e. g., data respectively generated by two or more different sensor types, or two or more types of sensor measurement) in response to stimuli applied or received at an associated contact surface portion (i.e., the region of the end effector's contact surface over which the superpixel is fixedly disposed). According to an aspect of the invention, each superpixel includes at least one pressure sensor, at least one vibration sensor, an optional proximity sensor and an optional temperature sensor that collect corresponding sensor data in response to corresponding stimuli, thereby providing data that may be used to determine events-of-interest occurring at each superpixel's associated contact surface portion. The pressure sensor of each superpixel (e.g., a strain gauge, a capacitive pressure sensor or a piezoelectric element) is configured to generate pressure (static event) data in response to an amount of static force applied to the corresponding surface portion, and the vibration sensor of each superpixel (e.g., a piezoelectric sensor, a piezoresistive sensor or a MEMS accelerometer) is configured to generate vibration (dynamic event) data in response to mechanical vibrations received at the corresponding surface portion. According to another aspect of the invention, a readout circuit receives the pressure data and vibration data generated by the spatially arrayed superpixels and operably transmits the received data to the robotic system's control circuit either directly (e.g., using a shared sensor data bus connected between the readout circuit and the controller circuit) or indirectly (e.g., by way of an optional multimodal control generator that is configured to pre-process the "raw" sensor data before being passed to the controller circuit). By providing the control circuit with both static force and vibration data collected from the end effector in this manner, the multimodal sensing architecture enhanced robotic system control based on both static events that occur on the end effector's contact surface (e.g., the force by which an object is being gripped by the end effector), and also dynamic events that periodically occur on the end effector's contact surface (e.g., mechanical vibrations generated when the object is slipping from the grasp of a gripper, or mechanical vibrations generated by contact between a grasped primary object and a secondary object). That is, by providing each superpixel with both static and dynamic event data, the multimodal sensing architecture of the present invention greatly enhances a host robotic system's ability to quickly identify non-standard operating conditions (e.g., object slip or misaligned/misplaced objects) and automatically implement a corrective operation (e.g., to adjust the gripping force applied by the end effector, or adjust the position of one object relative to an obstructive object). Even further enhancement of the multimodal sensing architecture's sensing capability may be achieved by way of utilizing proximity sensors in each superpixel to generate proximity data indicating distances between a target object and the multiple corresponding surface portions of the end effector, and/or by using temperature sensors to generate temperature data indicating the amount of thermal energy transferred to multiple corresponding surface portions of the end effector. By forming superpixels that include all four of these sensor types, the multimodal sensing architecture of the present invention enables robotic systems to utilize human-like tactile exploration (i.e., recognize vibrations, textures, and moments of contact with an object) to facilitate object-manipulation and recognition tasks that greatly enhance the adaptability of robot mechanisms to a wide range of functional operations (e.g., automatically adjusting to random variations arising in repetitive tasks) that present problems to robotic systems using conventional single-modality sensors.

According to a practical embodiment of the present invention, a robotic system implements the multimodal sensing architecture by way of disposing two or more multimodal sensor arrays on associated contact surfaces provided on opposing end effector fingers. In this case, each multimodal sensor array includes an associated feedback circuit that is operably coupled to the robotic system's control circuit by way of associated sensor data buses that extend along the robot (arm) mechanism, where each feedback circuit is configured to receive sensor data from a large number of superpixels and to transmit the sensor data in a time multiplexed manner, whereby the large amount of sensor data is efficiently transmitted to the control circuit using a small number of signal lines. In one embodiment, the control circuit is customized to process the "raw" sensor data from the two or more multimodal sensor arrays that is transmitted on the sensor data buses. In another embodiment, the multimodal sensing architecture further includes a multimodal control generator that receives and processes the "raw" sensor data from one or more multimodal sensor arrays, and generates multimodal control signals that are then transmitted to the control circuit for use in controlling operations performed by the robot mechanism and the end effector.

According to another embodiment of the present invention, a method for controlling a robotic system involves utilizing one or more sensors to generate both static event (e.g., pressure) data and dynamic event (e.g., vibration) data. As described above, the static event data is generated in response to static forces applied by a target object to corresponding contact surface portions on the end effector while grasping the target object, and the dynamic event (e.g., vibration) data is generated in response to vibrational forces applied to the corresponding contact surface portions on the end effector while the robot mechanism is being actuated to move the target object from one location to another location. The method also includes utilizing both the static event data and the dynamic event data to identify non-standard operating conditions while the target object is being moved, and adjusting the operation of the robot mechanism and/or the end effector in response to the identified non-standard operating condition. For example, a combination of constant static event data and increasing dynamic event data is used to identify undesirable slipping of the target object due to insufficient friction between the end effector and the target object. In this case, operation of the end effector is adjusted in response to the identified slipping condition, for example, by way of causing the end effector to increase the gripping force applied to the target object, thereby preventing undesirable dropping of the target object. In another example, a combination of constant static event data and sharply increasing dynamic event data is used to identify undesirable impact-type or scraping-type contact between a transported primary object and a stationary secondary object resulting from an unscheduled misalignment of one or both objects. In this case, operation of the robot mechanism is adjusted in response to the identified contact condition, for example, by way of translating (moving) the primary object in a way that removes the misalignment with the stationary secondary object, whereby subsequent movement of the primary object relative to the secondary object produces acceptable sensor data. In a presently preferred embodiment, the static/dynamic event data is generated using the superpixel configuration described above. In an alternative embodiment, the static/dynamic event data is generated using an array of single multimodal sensors (e.g., piezoelectric sensors or piezoresistive sensors) that are capable of detecting both static events and dynamic events. In this case, the associated readout circuit is modified to include signal processing circuitry (e.g., filters, etc.) configured to separate static event characteristics from dynamic event characteristics in each sensor's output signal, thereby enabling the above-mentioned identification of non-standard operating conditions and associated corrective adjustments using a smaller number of sensor nodes.

According to another embodiment of the present invention, a topology of the multimodal sensing architecture includes embedded multi-node readout circuitry that is configured to extract sensor data generated by the sensor nodes (e.g., the pressure sensors and vibration sensors) of each superpixel, and to coordinate periodic transmissions of the sensor data to the robotic system's control circuit over one or more shared signal lines, thereby greatly simplifying the process of integrating multimodal sensing capabilities into existing robot systems by minimizing the number of signal lines. The topology consists of two main integrated parts: a multimodal sensing platform (sensor layer) and a custom backplane integrated silicon readout circuit (readout layer). The sensor layer includes a silicon (or other) substrate upon which the superpixel sensor structures are fabricated using CMOS fabrication technologies or PCB fabrication processes. The readout layer includes an array of addressable readout circuit portions (pixels). In one embodiment each readout circuit portion includes a custom circuit that is capable of both reading voltage changes in analog sensor data signals and generating bias voltages or currents. In a specific embodiment, each readout circuit portion includes an analog front end with an analog-to-digital converter (ADC) and a digital-analog-converter (DAC). Additionally, an optional protective matrix is formed over the sensor layer, and an optional support substrate is disposed under the readout layer.

According to a presently preferred embodiment of the present invention, the multimodal sensing architecture is fabricated using a flexible substrate material such that the sensor arrays can be flexed without suffering any loss in performance. In a specific embodiment, the readout circuit of each array is fabricated using amorphous silicon (a-Si) thin-film transistor (TFT) elements.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in sensing architectures utilized in robotic systems. The following description is presented to enable one of ordinary skill in the art to make and use the invention as provided in the context of a particular application and its requirements. As used herein, directional terms such as "upper", "lower", "lowered", "front" and "back", are intended to provide relative positions for purposes of description and are not intended to designate an absolute frame of reference. With reference to electrical connections between circuit elements, the terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
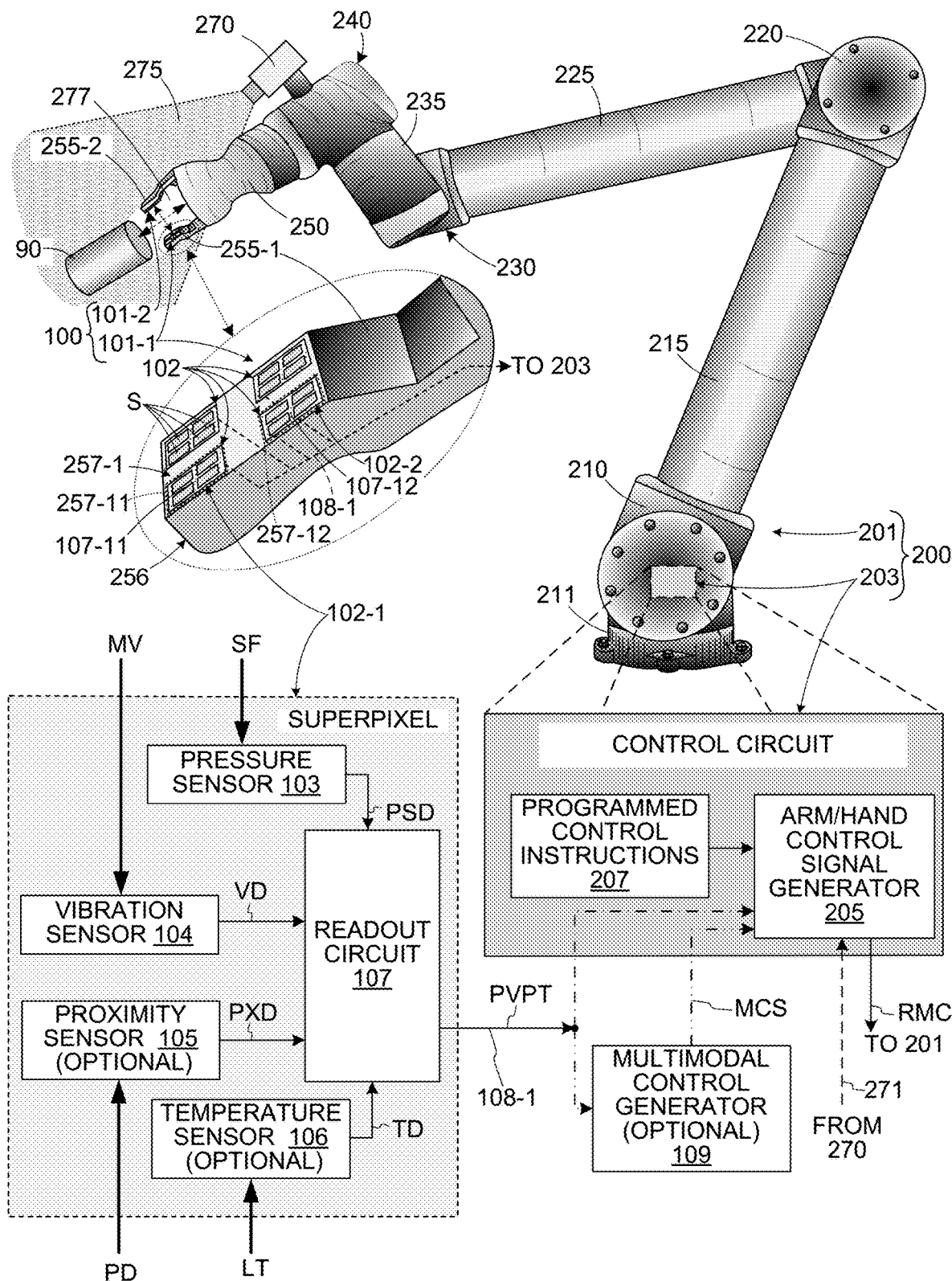
FIG. 1 is a diagram depicting a multimodal sensing architecture implemented on a robotic system according to an embodiment of the present invention.

FIG. 1 shows an exemplary robotic system 200 that is modified to include a multimodal sensing architecture according to an exemplary embodiment of the present invention. Robot system 200 generally includes a robot mechanism 201 and a control circuit 203, and multimodal sensing architecture 100 includes sensor arrays 101-1 and 101-2 disposed on an end effector 250 of robot mechanism 201. As described in detail below, sensor arrays 101-1 and 101-2 are operably coupled to control circuit 203, and control circuit 203 is configured to control operations performed by robot mechanism 201 (including end effector 250) in response to sensor data generated by sensor arrays 101-1 and 101-2.

Referring to the upper portion of FIG. 1, robot mechanism 201 includes various mechanisms and structures that are operably configured in accordance with known techniques to manipulate a target object 90 by way of selectively actuating electrical motors. In the exemplary embodiment robot mechanism 201 includes a shoulder/base mechanism 210 that is fixedly attached to a work surface (not shown) by way of a fixed base 211, an upper arm structure 215 extending from the shoulder/base mechanism 210 to an elbow mechanism 220, a forearm structure 225 extending from the elbow mechanism 220 to a wrist mechanism 230, a wrist structure 235 extending from the wrist mechanism 230 to hand/axial rotation mechanism 240, and an end effector 250 operably connected to a terminal portion of the hand/axial rotation mechanism 240. End effector 250 is a hand/gripper-type mechanism having two gripper fingers 255-1 and 255-2 that open (move away from each other) or close (move toward each other) in accordance with the corresponding actuation of motors mounted inside the gripper structure. Robot mechanism 201 also includes an optional camera 270 that is mounted near end effector 250 and provides image data to controller 203. As mentioned above, robot mechanism 201 is merely introduced to provide a context for explaining the features and benefits of multimodal sensing architecture 100, and the specific configuration of robot mechanism 201 is not intended to limit the appended claims.

Referring to the simplified block diagram located at the center right portion of FIG. 1, control circuit 203 includes a control signal generator 205 that is configured to control operations performed by robot mechanism 201 and end effector (hand) 250 in response to data received from several sources via wires (not shown) or other transmission medium. As described in the background section (above) control signal generator 205 receives a programmed series of movement operation/control instructions 207, and generates corresponding robot control signals RMC that are transmitted via wires (not shown) to specific electric motors disposed in robot mechanism 201, whereby target object 90 is manipulated in a programmed manner using end effector 250 (e.g., robot mechanism is actuated to move end effector toward object 90, and then end effector 250 is actuated such that gripper fingers 255 press against opposite sides of target object 90). In addition to programmed control instructions 207, control circuit 203 also receives image-type feedback data 271 that may be used to adjust the programmed operations in the manner described in the background section. However, as also explained in the background section and depicted in the upper left portion of FIG. 1, a region 277 of the camera's vision field 275 is typically occluded by portions of end effector 277, which limits the functionality of image data 271. Moreover, as explained in the background section, single-modality sensors fail to provide the information needed to avoid many common industrial accidents and/or to perform complex assembly processes. Accordingly, control circuit 203 is distinguished over conventional control circuits in that it also utilizes sensor-type feedback data generated by multimodal sensing architecture 100 in the manner described below.

Figure 2:
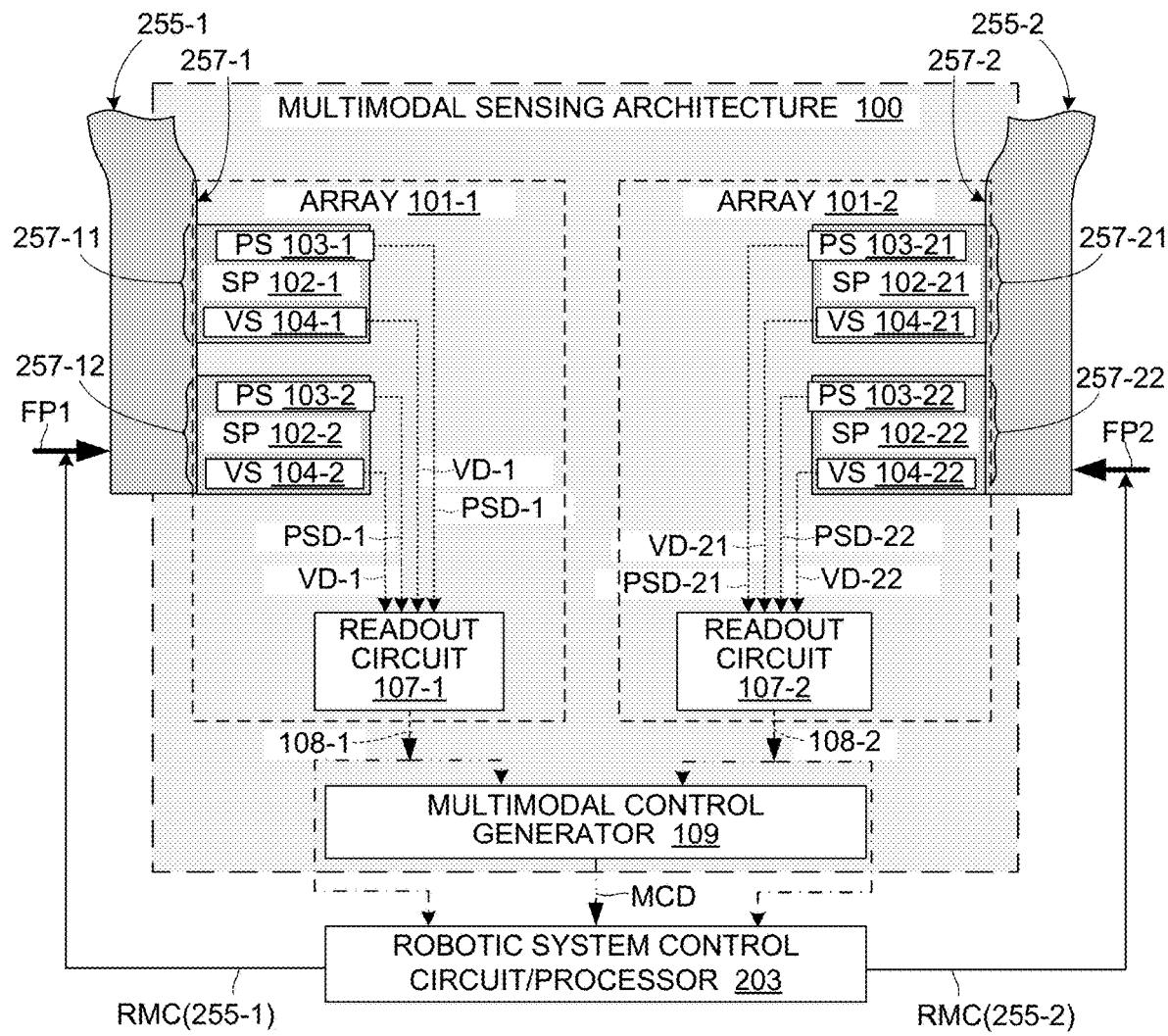
FIG. 2 is simplified block diagram depicting the multimodal sensing architecture of FIG. 1.

Referring to FIGS. 1 and 2, multimodal sensing architecture 100 includes sensor arrays 101-1 and 101-2 that are respectively fixedly attached to opposing contact surfaces 257-1 and 257-2 of gripper fingers 255-1 and 255-2, where each sensor array 101-1 and 101-2 includes multiple superpixels 102 that are fixedly disposed over corresponding surface portions of contact surfaces 257-1 and 257-2 and operably connected to an associated readout circuit. For example, as indicated in the enlarged bubble region showing a tip portion 256 of gripper finger 255-1 in FIG. 1 (and also in FIG. 2), sensor array 101-1 includes multiple super pixels 102, each disposed over a different portion (areal region) of contact surface 257. For example, superpixel 102-1 is disposed over contact surface portion 257-11 of contact surface 257-1, and superpixel 102-2 is disposed over contact surface portion 257-12 of contact surface 257-1. As further depicted in FIG. 2, superpixel 102-21 of array 101-2 is disposed over contact surface portion 257-21 of contact surface 257-2, and superpixel 102-2 is disposed over contact surface portion 257-22 of contact surface 257-2.

Each superpixel 102 includes multiple sensor nodes S that measure an associated different stimuli applied to its corresponding contact surface portion. For example, as indicated in the block diagram provided in the lower left portion of FIG. 1, superpixel 102-1 includes a pressure sensor 103 configured to generate pressure (static event) data PSD in response to an amount of static force SF received at corresponding surface portion 257-1, a vibration sensor 104 configured to generate vibration (dynamic event) data VD in response to mechanical vibrations MV applied onto corresponding surface portion 257-1, an optional proximity sensor 105 configured to generate proximity data PXD in response to a detected air-gap proximity distance PXD between corresponding surface portion 257-1 and an adjacent object (e.g., target object 90), and an optional temperature sensor 106 configured to generate temperature data TD in response to a local temperature LT applied to corresponding surface portion 257-1. In exemplary embodiments, pressure sensor 103 of each superpixel 102 is implemented by a strain gauge, a capacitive pressure sensor, a piezoelectric sensor or a piezoresistive sensor, vibration sensor 104 of each superpixel 102 is implemented by a piezoelectric sensor, a piezoresistive sensor, or a micromechanical system (MEMS) accelerometer, proximity sensor 105 of each superpixel 102 is implemented using a capacitive-coupling-type sensing element, and temperature sensor 106 of each superpixel 102 is implemented using a resistive temperature detectors (RTD) or a thermoelectric element.

Referring to FIG. 2, each array 101-1 and 101-2 also includes an associated readout circuit 107-1 and 107-2 configured to receive sensor data from all of the array's superpixels and to transmit the received sensor data onto an associated shared sensor data bus for transmission to control circuit 203. For example, as indicated in the bubble portion in FIG. 1, array 101-1 includes a first readout circuit portion 107-11 that collects sensor data from the various sensors of superpixel 102-1, and a second readout circuit portion 107-12 that collects sensor data from the various sensors of superpixel 102-2, where both readout portions 107-11 and 107-12 form part of readout circuit 107-1 (FIG. 1), which passes the collected sensor data onto shared sensor data bus 108-1. As indicated in FIG. 2, the sensor data collected by readout circuit 107-1 includes pressure data PSD-1 and PSD-2 generated by pressure sensors 103-1 and 103-2 of superpixels 102-1 and 102-2, and vibration data VD-1 and VD-2 from vibration sensors 104-1 and 104-2. Similarly, as shown in FIG. 2, readout circuit 107-2 of array 101-2 collects pressure data PSD-21 and PSD-22 generated by pressure sensors 103-21 and 103-22 and vibration data VD-21 and VD-22 from vibration sensors 104-21 and 104-22, and passes this collected data onto shared bus line 108-2 for transmission to control circuit 203.

As indicated near the bottom of FIG. 1, "raw" sensor data PVPT transmitted on shared sensor bus 108-1 may either be transmitted directly to control circuit 203 (i.e., along the single-dot-dash line/arrow), or transmitted indirectly to control circuit 203 by way of an optional multimodal control generator circuit 109 (i.e., as indicated by the double-dot-dash arrows). That is, in the case of the single-dot-dash-arrow, embodiment "raw" sensor data PVPT (i.e., serially transmitted pressure, vibration, proximity and temperature data) is transmitted directly to control signal generator 205. In this case, control signal generator 205 is modified to interpret sensor data PVPT and to generate appropriately responsive robot mechanism control signals RMC. In the alternative (double-dot-dash) embodiment, the required modification of control circuit 203 may be reduced by way of providing and configurating multimodal control generator circuit 109 to pre-process sensor data PVPT, and to generate multimodal control signals MCS that allow control signal generator 205 to generate the appropriately responsive robot mechanism control signals RMC with minimal processing time. For example, as indicated in FIG. 2, control circuit 203 is configured to control operations performed by end effector 250 in response to said multimodal control signals MCS. by way of transmitting robot mechanism control signals RMC (225-1) and RMC(225-2), which cause the end effector, e.g., to increase or decrease forces FP1 and FP2 applied by gripper fingers 255-1 and 255-2 on an object (not shown). In a practical embodiment, multimodal control generator circuit 109 is implemented using an application-specific integrated circuit (ASIC) or field programmable gate array (FPGA) that is configured to generate appropriate output signals in response to predetermined patterns occurring in sensor data PVPT.

FIGS. 3A to 3D depict gripper fingers 255-1 and 255-2 of robotic system 200 (shown in FIG. 1) during a series of operations involving grasping and moving target object 90, and illustrate an exemplary method for controlling a robotic system to move an object that is grasped in its end effector. In particular, FIGS. 3A to 3D illustrate an example of how the multimodal sensing architecture of the present invention is beneficially utilized to enhance the ability of robotic systems to quickly identify a slipping-type non-standard operating condition and to automatically implement an appropriate corrective operation by way of increasing the gripping force applied by end effector 250 on target object 90.

Figure 3A:
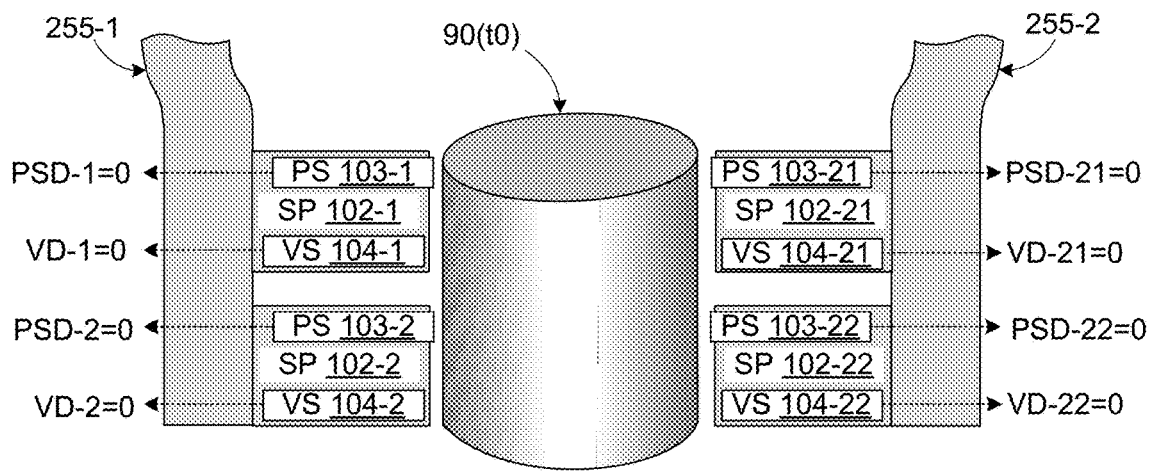
FIGS. 3A, 3B, 3C and 3D are simplified side views depicting an operation performed by the robotic system of FIG. 1 using static and dynamic event data generated by the multimodal sensing architecture of FIG. 1 in accordance with an exemplary embodiment.

FIG. 3A depicts target object 90 at an initial time t0 when target object is positioned at a pre-designated start position, and the robotic system positions gripper fingers 255-1 and 255-2 (i.e., by way of causing fingers 255-1 and 255-2 on opposite sides of target object 90). Note that in FIG. 3A all sensor output is assumed to be zero (e.g., PSD–1=0) because there is no contact between superpixels 102-1, 102-2, 102-21 and 102-22 and the sides of target object 90.

Figure 3B:
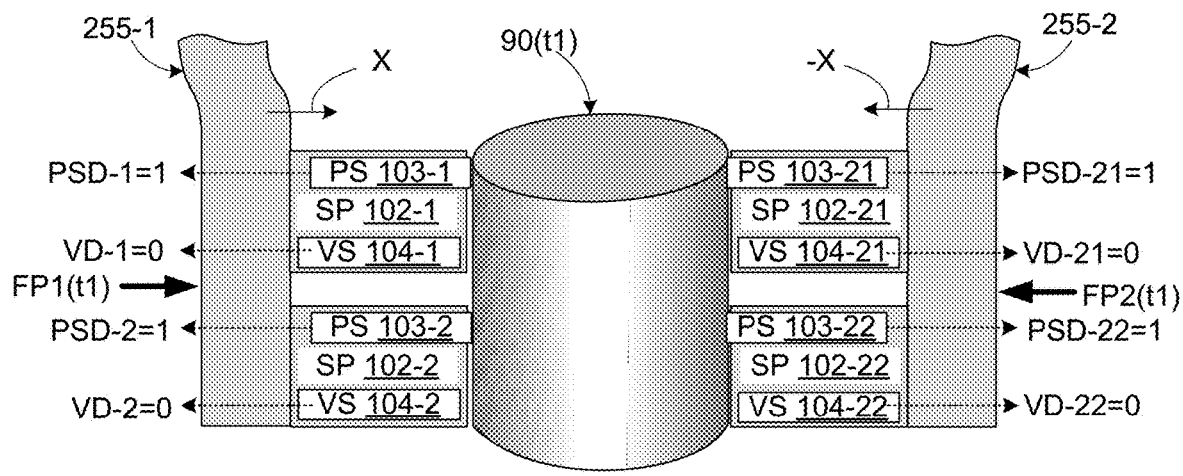

FIG. 3B depicts target object 90 at a subsequent time t1 when target object is grasped between fingers 255-1 and 255-2, which is achieved by way of actuating appropriate mechanisms of the robotic system to move gripper fingers 255-1 and 255-2 toward each other such that grip forces FP1($t1$) and FP2($t1$) are respectively applied by fingers 255-1 and 255-2 on the sides of target object 90. At this point, pressure sensors 103-1, 103-2, 103-21 and 103-22 are utilized to respectively generate static event data PSD-1, PSD-2, PSD-21 and PSD-22 in response to static forces applied by target object 90 to corresponding contact surface portions 257-1 and 257-2 on end effector fingers 255-1 and 255-2, respectively. Note that the recorded force value "1" is arbitrarily selected, and that vibration data values VD-1, VD-2, VD-21 and VD-22 are assumed to be zero to simplify the description.

Figure 3C:
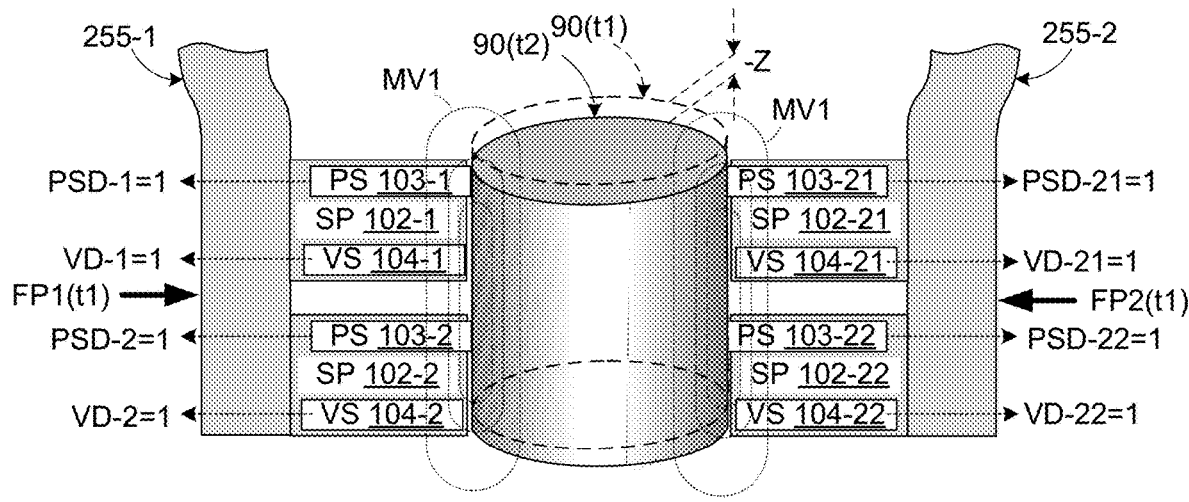
Figure 3D:
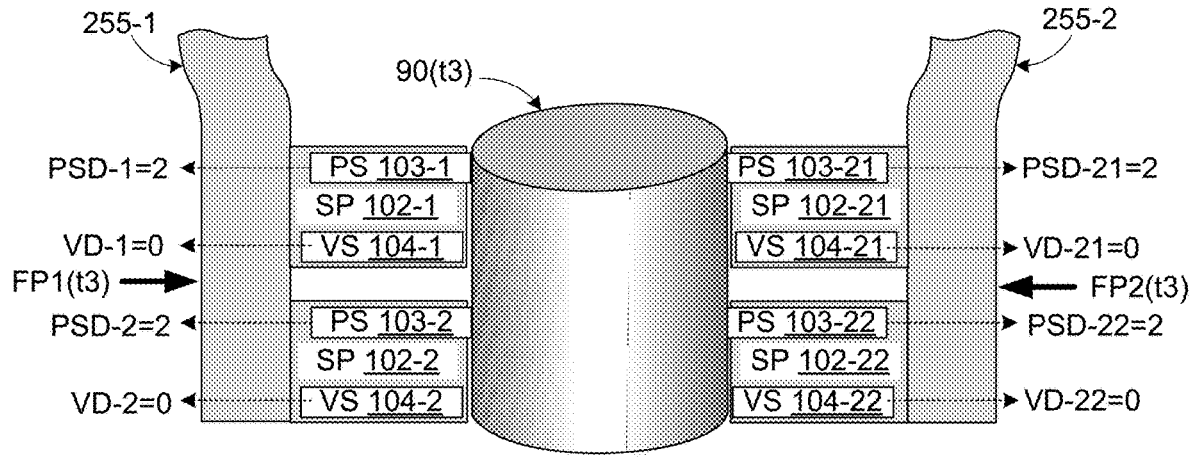

FIG. 3C depicts target object 90 at a subsequent time t2 while target object is grasped between fingers 255-1 and 255-2 and being transported by the robotic system from the pre-designated start position to a pre-designated destination position. For descriptive purposes it is assumed that target object 90 undergoes a slipping (dynamic) event in which object 90 slips an amount –Z relative to fingers 255-1 and 255-2 at some point during transport. Note that the grip forces FP1($t1$) and FP2($t1$) respectively applied by fingers 255-1 and 255-2 on the sides of target object 90 have not changed from time t1, so all static event data PSD-1, PSD-2, PSD-21 and PSD-22 remains unchanged (i.e., equal to "1"); that is, pressure sensors 103-1, 103-2, 103-21 and 103-22 are not able to detect the slipping event. However, slipping events of this type generate characteristic mechanical vibrations (forces) MV1 in fingers 255-1 and 255-2 that are detectable by vibration sensors 104-1, 104-2, 104-21 and 104-22. According to an aspect of the present invention, vibration sensors 104-1, 104-2, 104-21 and 104-22 are utilized to quickly identify the slipping event by way of respectively generating non-zero dynamic event data VD-1, VD-2, VD-21 and VD-22 in response to mechanical vibrations MV1. By configuring control circuit 203 to properly interpret the static and dynamic sensor data (e.g., by identifying that a slipping event is occurring when all static event data remains unchanged and all dynamic event data increases uniformly during transport of an object), the control circuit 203 is able to quickly implement a corrective action (i.e., adjust either the robot mechanism or the end effector) in response to the identified slipping (non-standard operating) condition, thereby preventing further slipping and possible loss of target object 90. For example, as indicated in FIG. 3D, a suitable corrective action may involve actuating appropriate mechanisms of the robotic system to move gripper fingers 255-1 and 255-2 toward each other such that grip forces FP1($t3$) and FP2($t3$) applied by fingers 255-1 and 255-2 on the sides of target object 90 are higher than those applied at time t2. Note that successful application of the corrective action is also immediately detected by way of an expected increase in static event data (e.g., pressure data values PSD-1, PSD-2, PSD-21 and PSD-22 increase from "1" at time t3 to "2" at time t4) and a concomitant decrease in dynamic event data (e.g., vibration data values VD-1, VD-2, VD-21 and VD-22 decreased from "1" at time t3 to "0" at time t4).

FIGS. 4A to 4D depict gripper fingers 255-1 and 255-2 of robotic system 200 (shown in FIG. 1) during a series of operations involving mounting a primary object 91 (e.g., a hollow cylinder with an open bottom end) over a secondary object 92 (e.g., a solid cylinder), and illustrate an exemplary method for controlling a robotic system during a relatively complex assembly process. In particular, FIGS. 4A to 4D illustrate examples of how multimodal sensing architecture of the present invention may be beneficially utilized to enhance the ability of robotic systems to adjust to various misalignments that may prevent completion of the assembly process if performed using conventional methods.

Figure 4A:
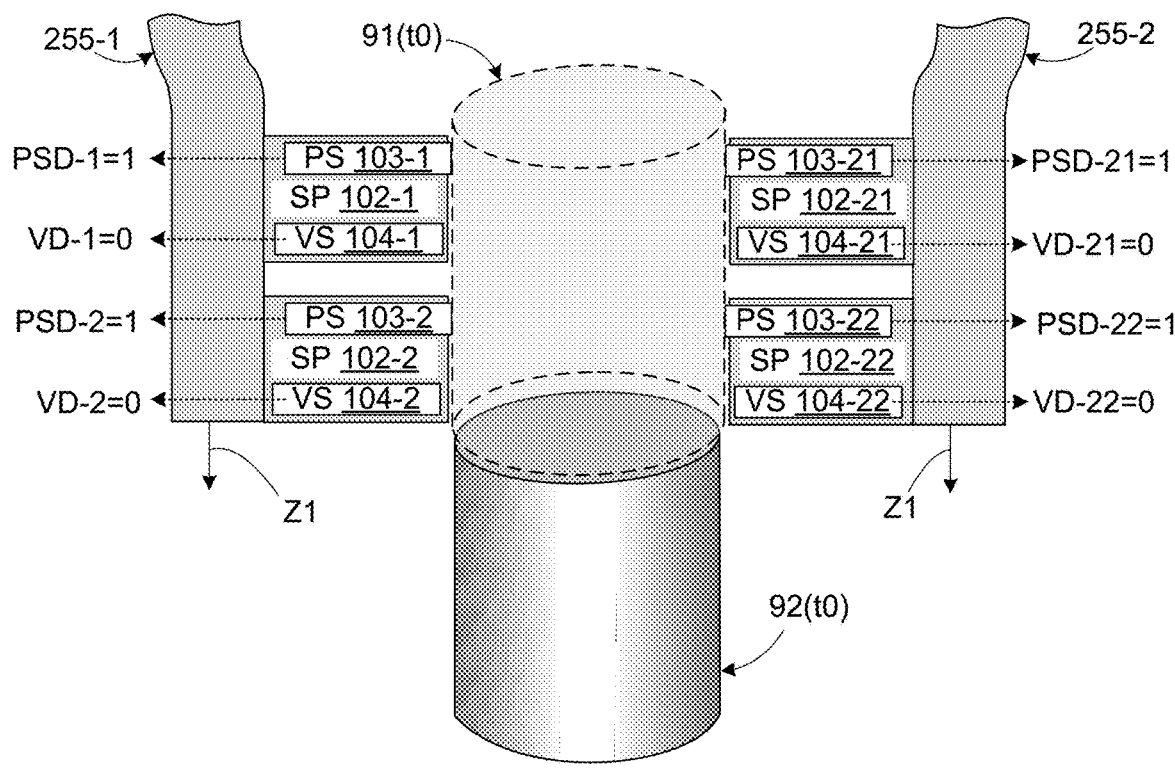
FIGS. 4A, 4B, 4C and 4D are simplified side views depicting an operation performed by the robotic system of FIG. 1 using static and dynamic event data generated by the multimodal sensing architecture of FIG. 1 in accordance with another exemplary embodiment.

FIG. 4A depicts a time t0 when primary object 91 is grasped between fingers 255-1 and 255-2 and moved into a pre-designated position for mounting over secondary object 92. Similar to the situation described above with reference to FIG. 3B, pressure sensors 103-1, 103-2, 103-21 and 103-22 are utilized to respectively generate static event data PSD-1, PSD-2, PSD-21 and PSD-22 in response to static forces applied by primary object 91, that the indicated pressure force value "1" is arbitrarily selected, and that vibration data values VD-1, VD-2, VD-21 and VD-22 are assumed to be zero for brevity.

Figure 4B:
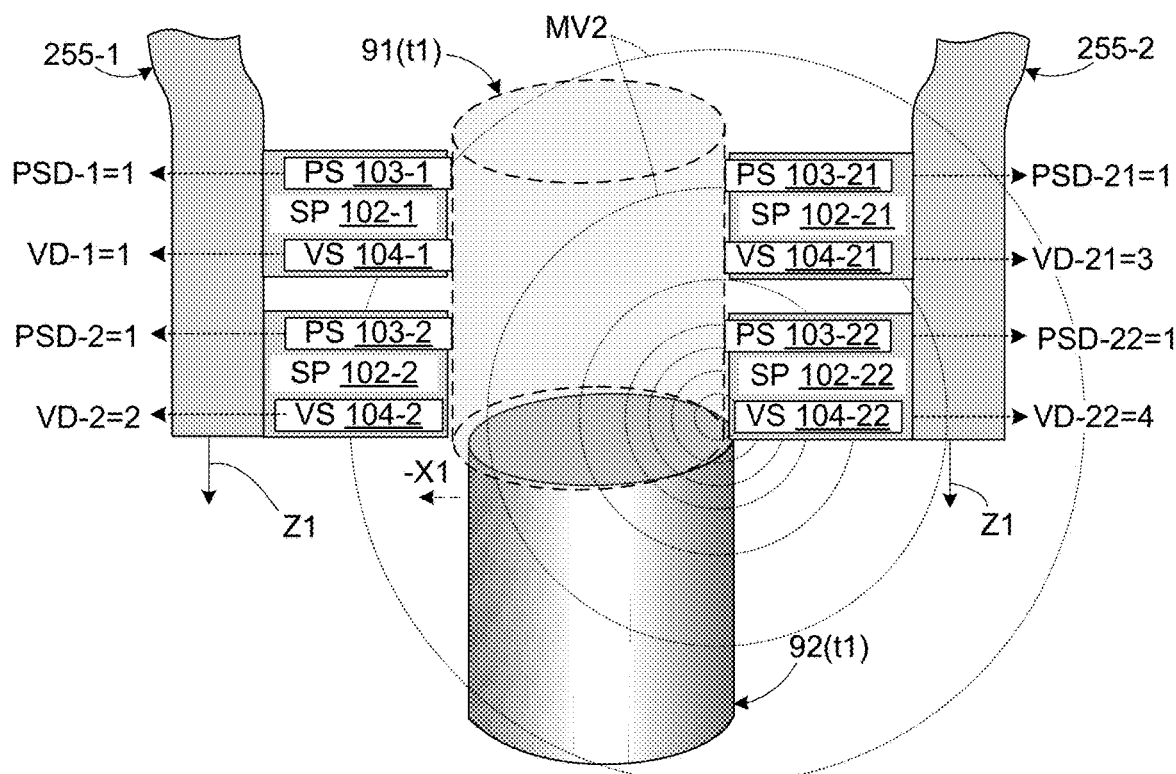

FIG. 4B indicates a first misalignment event occurring a time t1. In this case primary object 91 is displaced by a small distance –X1 relative to secondary object 92, whereby a lower right edge portion of primary object 91 contacts an upper surface of secondary object 92 as the robotic mechanism lowers primary object 91 in the –Z direction. Because the grip forces applied by fingers 255-1 and 255-2 on the sides of primary object 91 have not changed from time t0 to time t1, all static event data PSD-1, PSD-2, PSD-21 and PSD-22 remains unchanged (i.e., equal to "1"). However, the impact between objects 91 and 92 generates mechanical vibrations (forces) MV2 that radiate through fingers 255-1 and 255-2 in a characteristic manner such that the point of impact may be determined by combining static event data with the dynamic event data collected by vibration sensors 104-1, 104-2, 104-21 and 104-22. For example, when the static event data remains constant and vibration data VD-22 from vibration sensor 104-22 is higher (e.g., "4") than vibration data VD-21 from vibration sensor 104-21 (e.g., "3"), and both are higher than vibration data from vibration sensors 104-1 and 104-2, then an impact-type dynamic event may be identified and an impact location may be estimated. With this information, the robotic system's control circuit is able to automatically perform a corrective adjustment (e.g., by moving primary object 91 a small amount in the X direction), thereby achieving a suitable alignment between primary object 91 and secondary object 92 for the mounting process to continue.

Figure 4C:
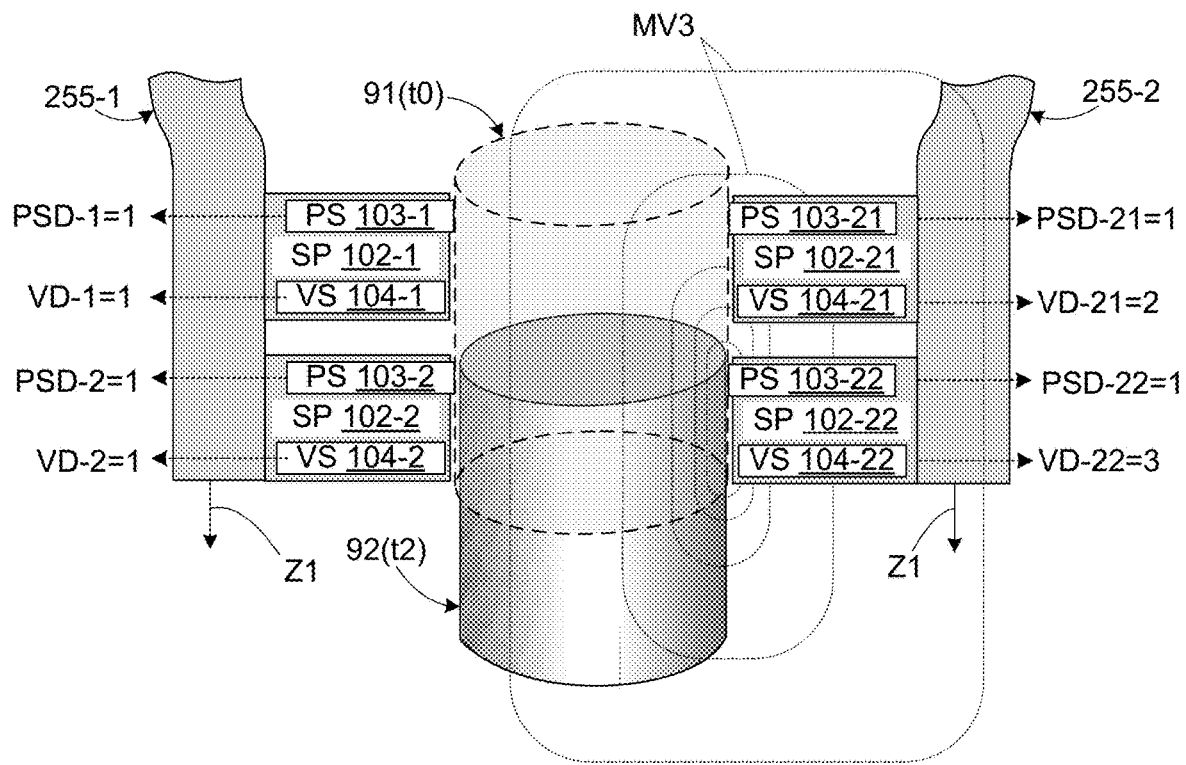

FIG. 4C indicates a second misalignment event occurring a time t2. In this case primary object 91 is positioned adequately to facilitate mounting over secondary object 92, but a minor displacement relative to secondary object 92 results in scraping (rubbing) contact between a portion of primary object 91 and secondary object 92. As in the previous example, static event data PSD-1 and PSD-2 remains unchanged (i.e., equal to "1"), but the scraping-type contact between objects 91 and 92 generates characteristic mechanical vibrations (forces) MV3 that allow the vibration sensors to identify the location of the scraping-type contact. Additionally, the imbalance in forces from the lack of contact of object 92 and 255-1, but contact with object 92 and object 255-2, may create a detectible pressure change by PSD-21 and PSD-22. For example, when the static event data remains constant and vibration data VD-21 and VD-22 is higher (e.g., "2") than vibration data VD-1 and VD-2 (e.g., "1") during the assembly operation, then a scraping-type dynamic event is occurring and contact point is near finger 255-2. With this information, the robotic system's control circuit is able to automatically perform a corrective adjustment (e.g., by moving primary object 91 a small amount in the X direction), thereby achieving an optimal alignment between primary object 91 and secondary object 92 that facilitates a scraping-free mounting process.

Figure 4D:
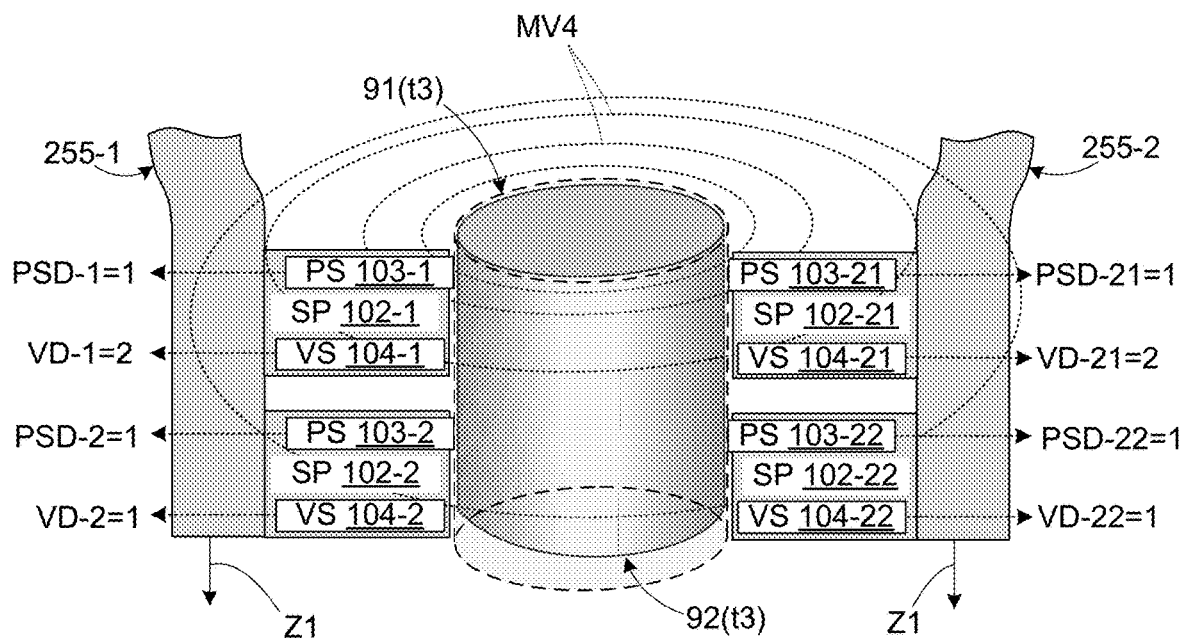

FIG. 4D depicts primary object 91 and secondary object 92 at the completion of the mounting process, which occurs at a time t3 when primary object 91 has been fully lowered over secondary object 92. In addition to utilizing the multimodal sensing architecture to detect impact-type or scraping-type contact for purposes of taking corrective action, the combination of dynamic event data and static event data may also be utilized to confirm the successful completion of an assembly operation by way of recording an expected final contact (or non-contact) event. For example, the successful mounting of primary object 91 on secondary object 92 may produce characteristic mechanical vibrations MV4 only when precise alignment between the objects has been achieved. Conversely, mechanical vibrations MV4 may only be generated when the assembly process was completed incorrectly. In either case, the ability to detect both static and dynamic event data allows the multimodal sensing architecture to provide information that cannot be obtained using cameras or single-modality sensors.

Although the examples of FIGS. 3A to 4D are described with reference to superpixels that include two separate sensor (i.e., a pressure sensor 103-$x$ and a vibration sensor 104-$x$), the methodology utilized in these examples may be implemented using a single multimodal sensor in place of each superpixel, provided each single multimodal sensor is capable of detecting both static and dynamic events, and provided the readout circuit is configured to separately generate both static event data and dynamic event data from an output signal generated by each multimodal sensor. In alternative single-multimodal-sensor embodiments each superpixel of the array described above is replaced with either a piezoelectric sensor or a piezoresistive sensor; both of these sensor types qualify as multimodal sensors in that they generate sensor output signals including both static event characteristics (e.g., direct current magnitude) and dynamic event characteristics (e.g., alternating current magnitude). By configuring the readout circuits to separate and measure the static/dynamic characteristics in the output signal generated by each multimodal sensor (e.g., by way of filters and other known signal processing techniques), the static/dynamic event data values described above with reference to FIGS. 3A to 4B are made available for use by a robotic system's control circuit, thereby facilitating implementation of the associated automatically performed corrective adjustments.

Figure 5:
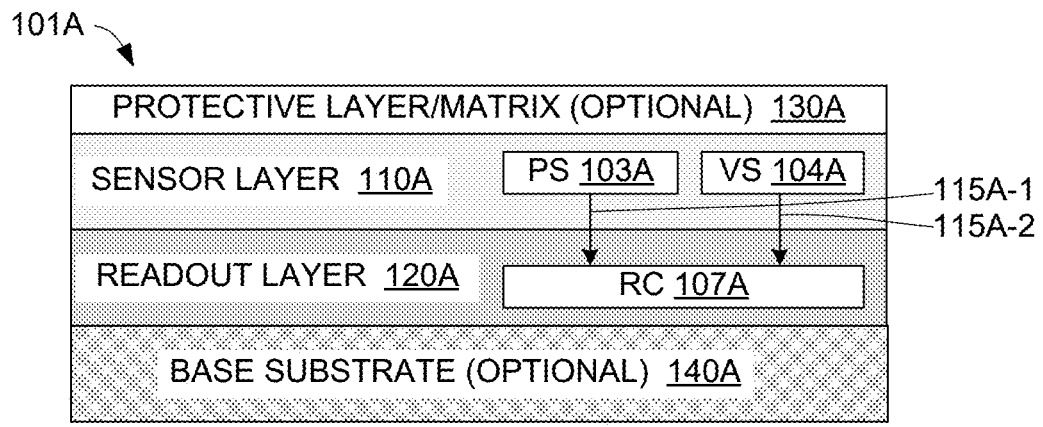
FIG. 5 is a simplified cross-sectional side view showing a sensor array of a multimodal sensing architecture according to a specific embodiment.

FIG. 5 is a simplified cross-sectional side view showing a sensor array 101A of a multimodal sensing architecture according to a specific embodiment of the present invention. Data readout from sensor networks or arrays of sensor nodes are often realized by using wires or electrical interconnects directly routed to the sensor nodes. However, though simplistic and convenient, these wires become cumbersome when dealing with a large number sensor network with thousands of nodes. Specifically, for application such as tactile sensing/exploration in robotic end effectors, this type of wiring, with interconnects directly in the sensor plane, becomes a real issue. With a large array of multimodal sensor nodes, this configuration is not only impractical (both in terms of footprint and data acquisition), but can also introduces noise and cross-talk in the robotic tactile sensors. The topology implemented in sensor array 101A addresses this problem by way of providing a frontplane sensor layer 110A and a separate backplane readout layer 120A that are integrally connected in a way that minimizes wiring between the large number of sensors in sensor array 101A and a host robotic system control circuit. In one embodiment, the various sensors of each superpixel (e.g., pressure sensor 103A and vibration sensor 104A) are fabricated or otherwise disposed on sensor layer 110A, and layout circuit 107A is disposed on readout layer 120A, where pressure sensor 103A and vibration sensor 104A are operably coupled to readout circuit 107A by way of via-type signal lines 115A-1 and 115A-2, respectively, that extend between sensor layer 110A and readout layer 120A.

In one embodiment, the topology of sensor 101A further includes one or both of a protective layer/matrix 130A disposed over sensor layer 110A, and a base substrate 140A disposed under readout layer 120A. In practical embodiments, protective layer/matrix 130A comprises one of a flexible material (e.g., silicone), silicon or a hard shell material (e.g., aluminum, where appropriate such as around the perimeter), and has a thickness in the range of one micron to one millimeter. In other embodiments, optional base substrate 140A comprises one of silicon, glass, steel, plastic and aluminum, and has a thickness in the range of ten microns and one millimeter.

Figure 6:
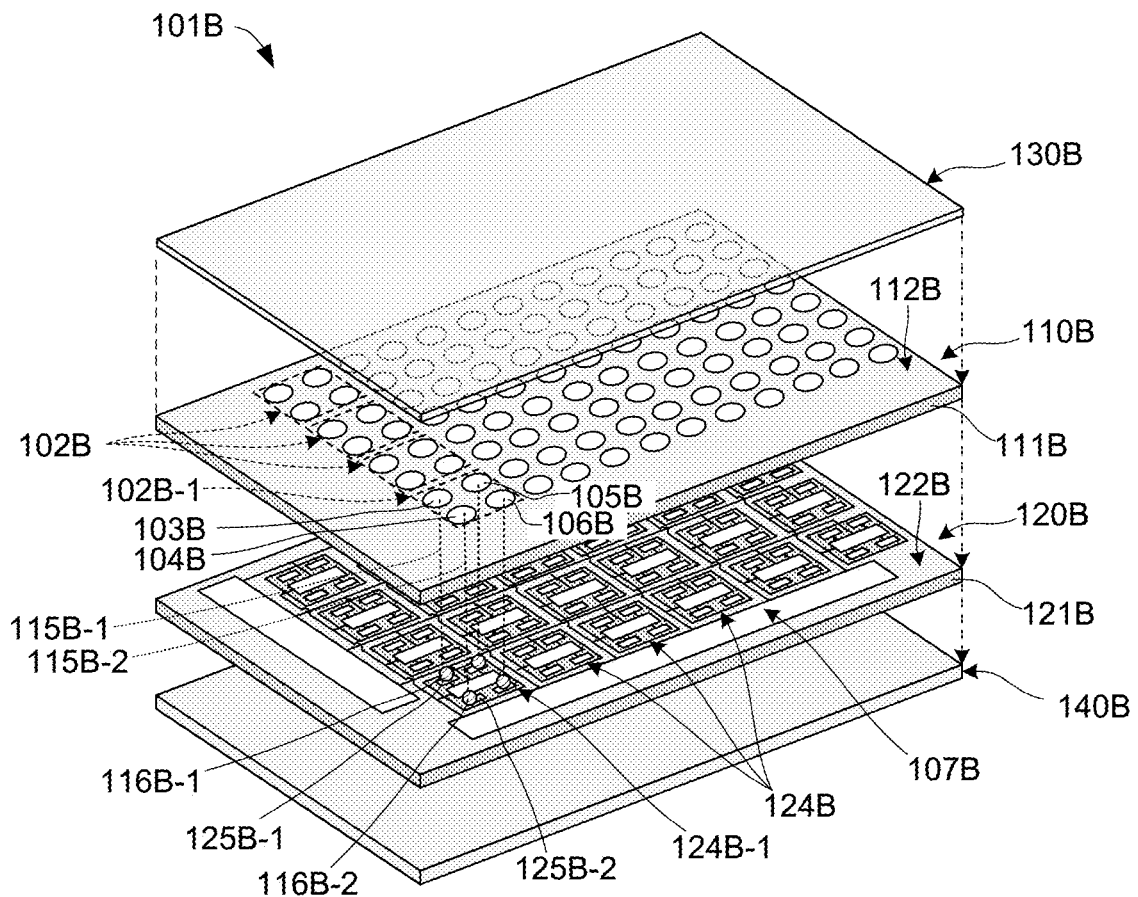
FIG. 6 is an exploded perspective view showing an exemplary sensor array of a multimodal sensing architecture according to another specific embodiment.

FIG. 6 is an exploded perspective view showing an exemplary sensor array 101B according to another specific embodiment. Sensor array 101B has a topology similar to that of array 101A, including a sensor layer 110B, a readout layer 120B, an optional protective layer 130B and a base substrate 140B. In this case, sensor layer 110B includes a silicon substrate 111B on which superpixels 102 are fabricated using CMOS or microfabrication techniques such that each superpixel includes the various sensor types described above (e.g., superpixel 102B-1 includes a pressure sensor 103B, a vibration sensor 104B, a proximity sensor 105B and a temperature sensor 106B. In addition, readout layer 120B also includes a silicon substrate 121B with readout circuit 107B implemented thereon by way of CMOS fabrication techniques such that each superpixel 102B on substrate 101B is aligned with a corresponding readout circuit portion 124B (e.g., such that sensor nodes 103B to 106B of superpixel 102B-1 are aligned with input nodes provided in corresponding readout circuit portion 124B-1). During the manufacturing process, substrate 111B is fixedly attached to substrate 121B by a die-attach method such that pressure sensor 103B and vibration sensor 104B are operably coupled to corresponding input nodes 125B-1 and 125B-2 of readout circuit 107B by way of bumps 116B-1 and 116B-2 (e.g., indium bumps, solder bumps or polymer bumps), which respectively form at least a portion of signal paths 115B-1 and 115B-2 extending between substrates 111B and 121B.

Figure 7:
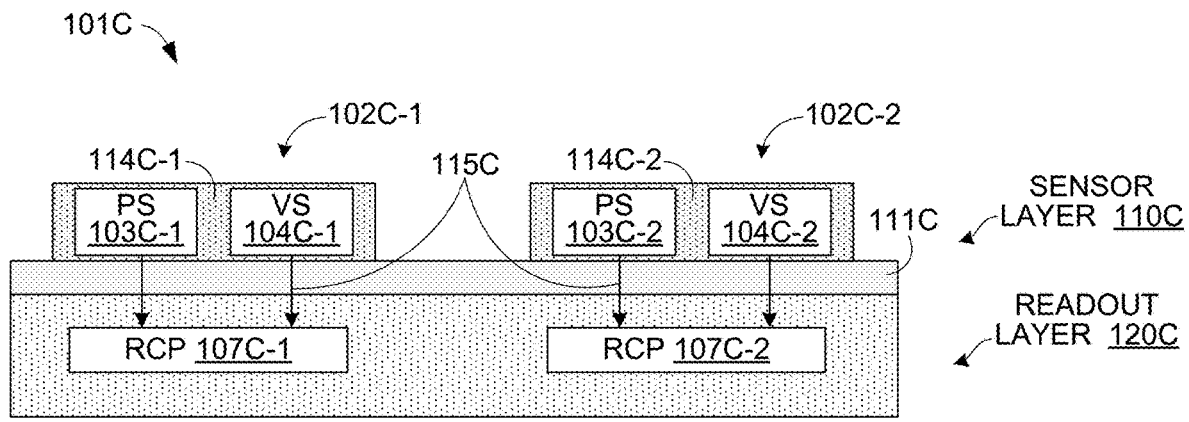
FIG. 7 is a simplified cross-sectional side view showing a sensor array of a multimodal sensing architecture according to another specific embodiment.

FIG. 7 is a simplified cross-sectional side view showing a sensor array 101C having a topology according to another specific embodiment. In this case, each superpixel 102C-1 and 102C-2 of sensor array 101C is respectively fabricated on a separate associated silicon island 114C-1 and 114C-2, and silicon islands 114C-1 and 114C-2 are mounted over a readout layer 120C (e.g., by way of an intervening silicon substrate 111C). The various sensors of superpixels 102C-1 and 102C-2 are operably coupled to associated readout circuit portions 107C-1 and 107C-2 by way of via-type signal lines 115C, which are produced using any of the relevant techniques mentioned herein.

Figure 8:
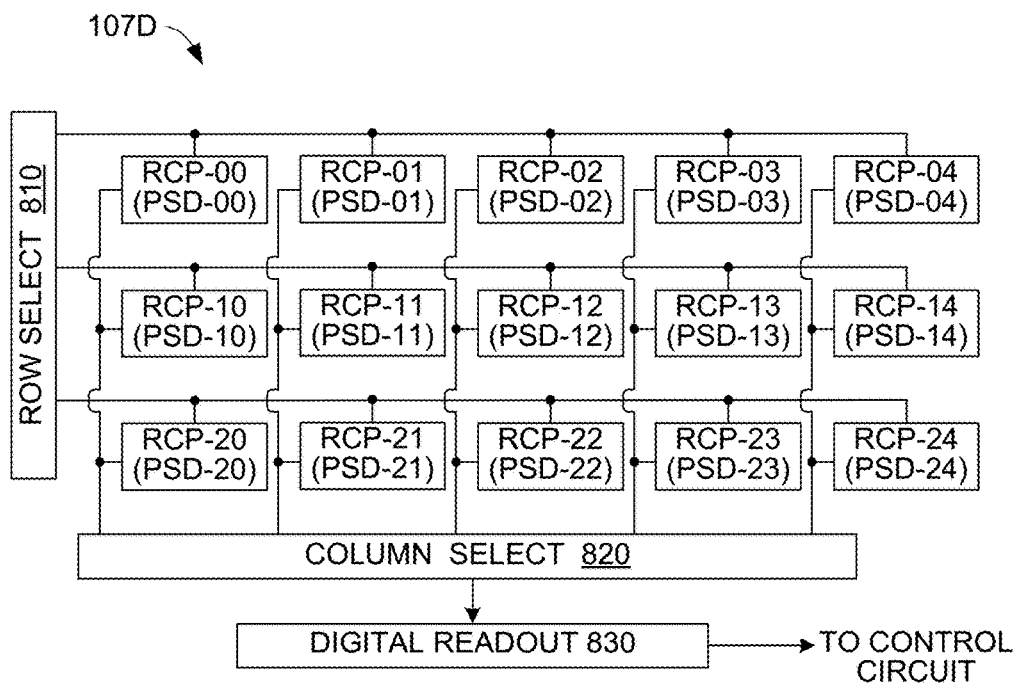
FIG. 8 is a block diagram depicting a readout circuit of a sensor array of a multimodal sensing architecture according to another specific embodiment.

FIG. 8 is a block diagram depicting a readout circuit 107D of a sensor array according to another specific embodiment. Readout circuit 107D includes an array of readout portions (pixels) RCP-00 TO RCP-24 that are respectively configured and operably coupled to receive associated sensor data (e.g., pressure data values PSD-00 to PSD-24, respectively) from corresponding pressure sensors (not shown). Readout circuit 107D also includes readout control circuits (e.g., a row select circuit 810, a column select circuit 820) that are configured to sequentially transfer the sensor data (e.g., pressure data values PSD-00 to PSD-24) from each readout portion RCP-00 TO RCP-24 to a digital readout circuit 830, which in turn is configured to convert the sensor data into digital values for transfer to a control circuit or other circuit.

Figure 9:
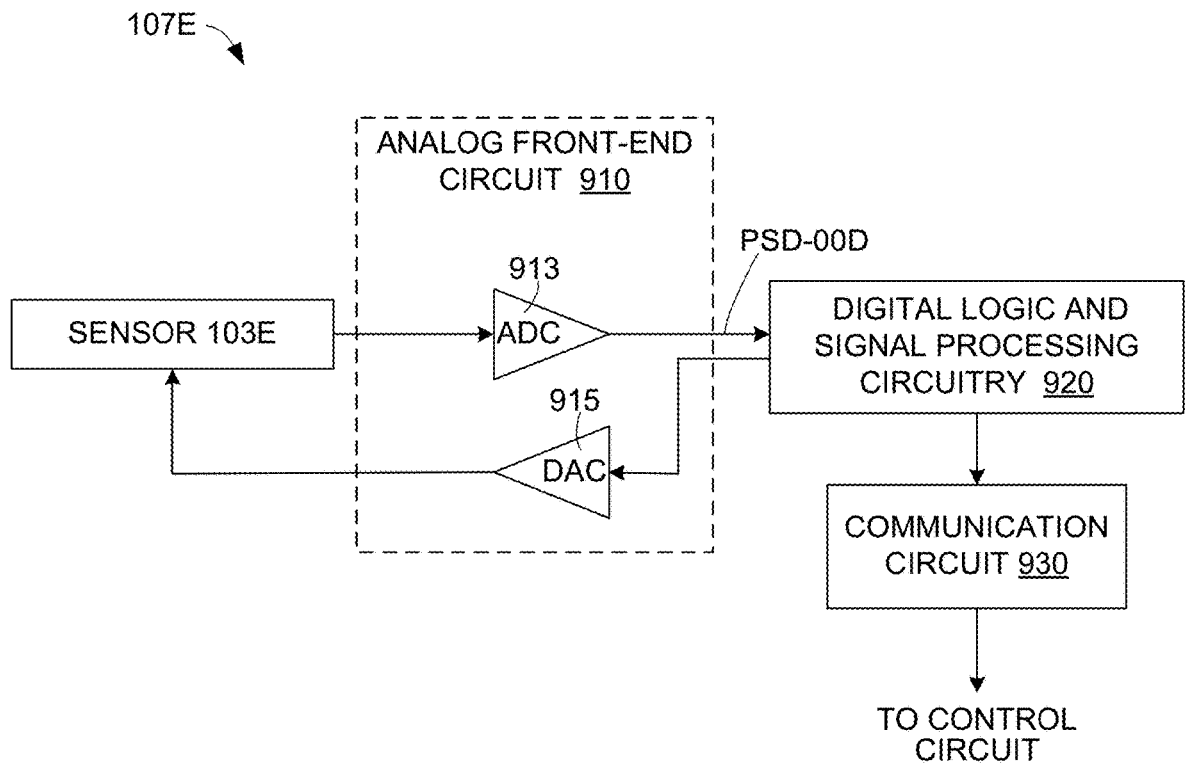
FIG. 9 is a simplified circuit diagram depicting a partial readout circuit of a sensor array of a multimodal sensing architecture according to another specific embodiment.

FIG. 9 is a block diagram depicting a readout circuit portion 107E according to another specific embodiment. Readout circuit portion 107E comprises analog front-end 910 including an analog-to-digital converter (ADC) 913 and a digital-analog-converter (DAC) 915, digital circuitry 920 including digital logic and signal processing, and a digital communications interface 930. Analog circuitry 910 is configured to receive analog sensor data (e.g., pressure data value PSD-00A) from corresponding sensor nodes of associate superpixels (e.g., sensor 103E), and configured to generate digital data values (e.g., digital pressure data value PSD-00D) that is transmitted to digital circuitry 920. Digital circuitry 920 is configured to transfer the digital sensor data to a host robotic system's control circuit via the communications interface 930.

Figure 10:
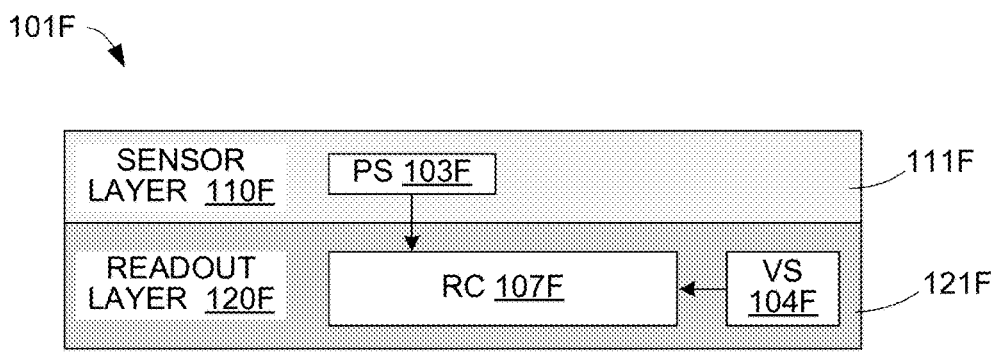
FIG. 10 is a simplified cross-sectional side view showing a sensor array of a multimodal sensing architecture according to another specific embodiment.

FIG. 10 is a simplified cross-sectional side view showing a sensor array 101F according to another specific embodiment. Data acquisition from sensor network or arrays of sensor nodes, especially on flexible substrates, are often realized by the use of wires or electrical interconnects directly routed to the sensor nodes. The interconnects on polymer substrates typically lie on the same plane. While this approach simplifies the manufacturing process, these wires become cumbersome when dealing with a large number sensor network with thousands of nodes. Specifically, for application such as tactile sensing/exploration in robotic end effectors, this type of wiring, with interconnects directly in the sensor plane, becomes a real issue. With a large array of multimodal sensor nodes, this configuration is not only impractical (both in terms of footprint and data acquisition) but can also introduces noise and cross-talk in the robotic tactile sensors. Rigid silicon backplanes can also be impractical in some instances because they can break with any kind of bending, flexing or twisting. Accordingly, sensor array 101F includes a flexible electronics inspired topology with an amorphous silicon backplane integrated to a frontplane sensor architecture to address this problem.

Referring to FIG. 10, array 101F includes a sensor layer 110F having one or more sensors (e.g., pressure sensor 103F) formed on a first substrate 111F, and a readout layer 120F including second substrate 121F on which a readout circuit 107F is fabricated as an amorphous-silicon (a-Si) integrated circuit including a plurality of a-Si thin-film transistor (TFT) elements. In one embodiment, one or more sensor nodes (e.g., vibration sensor 104F) is/are also fabricated on readout layer 120F using TFT elements. In one embodiment custom a-Si TFT readout circuit 107F is a pixel matrix with addressable pixels.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with specific reference to articulated-type robotic systems that use two-finger end effectors, the multimodal sensing architecture disclosed herein may also be beneficially utilized in advanced robotic systems that utilize three, four or five finger end effectors (e.g., human-like robotic hands), and may also be utilized in other mechanical systems as well, such as on prosthetic limbs. In some embodiments a multimodal sensing architecture may comprise a single sensor array operably mounted on a single finger of a multi-finger end effector or on a probe-like end effector. Further, those skilled in the art will understand that the sensors and superpixels of the present invention can have different interrelated configurations, orientations, placement of nodes, sensors, array size, periodicity/aperiodicity, different circuit configurations inside the pixel array, etc., while still embodying the spirit and scope of the inventive concept. For example, although the invention is described primarily with reference to CMOS or TFT-type sensors fabricated on associated silicon substrates, suitable sensor and superpixel arrays may also be produced by forming or placing sensors/superpixels on printed circuit boards (PCBs) using well-known PCB fabrication techniques.

The invention claimed is:

1. A method for controlling a robotic system including a robot mechanism having an end effector including a plurality of spatially arrayed superpixels, each said superpixel including an associated pressure sensor and an associated vibration sensor disposed over a corresponding contact surface portion of the end effector, the end effector being configured to grasp a target object, and the robot mechanism being configured to move the target object while being grasped by the end effector, the method comprising:

controlling the pressure sensors of said plurality of spatially arrayed superpixels such that each said pressure sensor generates associated time-based localized static event data values in response to static forces applied to said corresponding contact surface portion on the end effector while the target object is grasped by the end effector;

controlling the vibration sensors of said plurality of spatially arrayed superpixels such that said each said vibration sensor generates associated time-based localized dynamic event data values in response to vibrational forces applied to said corresponding contact surface portion on the end effector while the robot mechanism is moving the target object;

while the robot mechanism is moving the target object, identifying a location of a non-standard operating condition using changes in at least one of said time-based localized static event data values and said time-based localized dynamic event data values; and adjusting the end effector in response to said identified non-standard operating condition location.

2. The method of claim 1, further comprising:

using both said static event data and said dynamic event data to identify slipping of said target object relative to said end actuator, and conrolling the end effector to increase a grip force applied to the target object in response to said identified slipping.

3. The method of claim 1,
wherein identifying said non-standard operating condition location includes using both said static event data and said dynamic event data to identify an undesirable contact location at which undesirable contact between said target object and a secondary object occurs, and
wherein adjusting the end effector comprises controlling the robot mechanism to move the target object to a location that relative to the secondary object such that the undesirable contact is avoided.

4. The method of claim 1, wherein controlling the robotic system comprises performing an assembly process including the target object and a secondary object.

5. The method of claim 4, wherein the target object comprises a hollow structure having an open bottom end, and wherein performing the assembly process comprises mounting the target object over the secondary object such that at least a portion of the secondary object extends through the open bottom end into the hollow structure when the assembly process is successfully completed.

6. The method of claim 4, wherein identifying the location of the non-standard operating condition comprises detecting a misalignment between said target object and said secondary object by detecting changes in one or more time-based localized dynamic event data values generated by associated vibration sensors located adjacent to an impact location between said target object and said secondary object during said assembly process.

7. The method of claim 4, wherein identifying the location of the non-standard operating condition comprises detecting a misalignment between said target object and said secondary object by detecting changes in one or more time-based localized dynamic event data values generated by associated vibration sensors located adjacent to a scraping-type contact location between said target object and said secondary object during said assembly process.

8. The method of claim 4, further comprising using both said static event data and said dynamic event data to detect an expected final contact event that confirms a successful completion of said assembly process.

* * * * *